(12) United States Patent
Camwell et al.

(10) Patent No.: US 8,982,667 B2
(45) Date of Patent: Mar. 17, 2015

(54) ACOUSTIC TELEMETRY STACKED-RING WAVE DELAY ISOLATOR SYSTEM AND METHOD

(75) Inventors: Paul L. Camwell, Calgary (CA); David D. Whalen, Calgary (CA); Douglas S. Drumheller, Cedar Crest, NM (US)

(73) Assignee: Xact Downhole Telemetry, Inc., Calgary, Alberta (CA)

( * ) Notice: Subject to any disclaimer, the term of this patent is extended or adjusted under 35 U.S.C. 154(b) by 1018 days.

(21) Appl. No.: 12/705,346

(22) Filed: Feb. 12, 2010

(65) Prior Publication Data
US 2010/0208552 A1 Aug. 19, 2010

Related U.S. Application Data

(60) Provisional application No. 61/152,337, filed on Feb. 13, 2009.

(51) Int. Cl.
*E21B 47/14* (2006.01)
*G01V 1/40* (2006.01)
(Continued)

(52) U.S. Cl.
CPC .............. *E21B 47/16* (2013.01); *G01V 11/002* (2013.01)
USPC ......... 367/82; 367/81; 340/854.3; 340/854.4; 340/854.5; 340/856.4

(58) Field of Classification Search
CPC ......... E21B 47/12; E21B 47/14; E21B 47/16; G01V 1/52; G01V 11/002; G10K 11/16; G10K 11/161; G10K 11/162; G10K 11/168
USPC ....................... 367/43–46, 81–85; 340/853.1, 340/854.3–584.9, 856.3–856.4, 854.4; 181/102
See application file for complete search history.

(56) References Cited

U.S. PATENT DOCUMENTS 3,268,859 A 8/1966 Watts
3,529,682 A 9/1970 Coyne et al.
(Continued)

FOREIGN PATENT DOCUMENTS

WO WO-2009146548 12/2009

OTHER PUBLICATIONS

Drumheller, Douglas S., "Wave Impedances of Drill Stings and Other Periodic Media", *The Journal of the Acoustical Society of America*, vol. 112, No. 6 (Dec. 2002),pp. 2527-2539.
(Continued)

*Primary Examiner* — Hai Phan
*Assistant Examiner* — Franklin Balseca
(74) *Attorney, Agent, or Firm* — Law Office of Mark Brown, LLC; Mark E. Brown; Christopher M. DeBacker

(57) ABSTRACT

A stacked-ring, slow-wave acoustic telemetry isolation system and method for use with tubular assemblies such as drillpipe or production tubing comprising an acoustic wave transmitter, the acoustic isolator behaving such that a "down" wave propagated toward the isolator is reflected back substantially in phase with an "up" wave propagated from the acoustic wave source away from the isolator. The acoustic isolator is similarly effective in reflecting "up" propagating waves originating from below the isolator, hence further protecting the acoustic wave source from possible deleterious interference. It causes substantially all of the emitted wave energy to travel in a chosen direction along the drill pipe, thus aiding the efficiency of acoustic telemetry said pipe.

14 Claims, 10 Drawing Sheets

(51) Int. Cl.
*E21B 47/16* (2006.01)
*G01V 3/00* (2006.01)
*G01V 11/00* (2006.01)

(56) References Cited

U.S. PATENT DOCUMENTS

| | | | |
|---|---|---|---|
| 3,828,867 | A | 8/1974 | Elwood |
| 3,876,016 | A | 4/1975 | Stinson |
| 3,979,724 | A | 9/1976 | Silverman et al. |
| 4,021,773 | A | 5/1977 | Keenan |
| 4,984,289 | A | 1/1991 | Arakawa et al. |
| 5,070,462 | A | 12/1991 | Chau |
| 5,128,901 | A | 7/1992 | Drumheller |
| 5,160,925 | A | 11/1992 | Dailey et al. |
| 5,477,505 | A | 12/1995 | Drumheller |
| 5,720,354 | A | 2/1998 | Stump et al. |
| 6,161,630 | A | 12/2000 | Stump et al. |
| 6,177,882 | B1 | 1/2001 | Riggenberg et al. |
| 6,250,402 | B1 | 6/2001 | Brune et al. |
| 6,320,820 | B1 | 11/2001 | Gardner et al. |
| 6,435,286 | B1 | 8/2002 | Stump et al. |
| 6,535,458 | B2 | 3/2003 | Meehan |
| 6,588,267 | B1 * | 7/2003 | Bradley ............... 73/152.47 |
| 6,791,474 | B2 | 9/2004 | Lenz et al. |
| 6,915,875 | B2 * | 7/2005 | Dubinsky et al. ......... 181/102 |
| 6,920,943 | B2 | 7/2005 | Mercer et al. |
| 6,956,791 | B2 | 10/2005 | Dopf et al. |
| 6,968,909 | B2 | 11/2005 | Aldred et al. |
| 7,068,183 | B2 * | 6/2006 | Shah et al. ............. 340/854.4 |
| 7,228,900 | B2 | 6/2007 | Schultz et al. |
| 7,605,715 | B2 | 10/2009 | Clark et al. |
| 7,663,373 | B1 | 2/2010 | Gard et al. |
| 7,958,952 | B2 | 6/2011 | Kusko et al. |
| 7,997,380 | B2 * | 8/2011 | Arian et al. ............. 181/102 |
| 8,215,419 | B2 | 7/2012 | Plunkett et al. |
| 2002/0031050 | A1 | 3/2002 | Blevins et al. |
| 2003/0006071 | A1 | 1/2003 | Stump et al. |
| 2003/0076106 | A1 | 4/2003 | Mercer |
| 2003/0155915 | A1 | 8/2003 | Kruspe et al. |
| 2006/0131014 | A1 | 6/2006 | Huang et al. |
| 2007/0039776 | A1 | 2/2007 | Clark |
| 2007/0153629 | A1 * | 7/2007 | Drumheller et al. ........ 367/162 |
| 2007/0257809 | A1 | 11/2007 | Camwell et al. |
| 2008/0106433 | A1 | 5/2008 | Madhavan et al. |
| 2008/0191900 | A1 | 8/2008 | Camwell et al. |
| 2009/0107723 | A1 | 4/2009 | Kusko et al. |
| 2009/0107757 | A1 * | 4/2009 | Lindner et al. ............ 181/102 |
| 2010/0282509 | A1 | 11/2010 | Plunkett et al. |
| 2011/0100712 | A1 | 5/2011 | Poedjono |
| 2011/0316542 | A1 | 12/2011 | Frey et al. |
| 2013/0032412 | A1 | 2/2013 | Haugvaldstad et al. |

OTHER PUBLICATIONS

"Schlumberger Oilfield Glossary entry for "bottomhole assembly"", www.glossary.oilfield.slb.com, accessed Dec. 22, 2012.

"International Search Report and Written Opinion for PCT/US2011/032532", (Jun. 30, 2011).

Drumheller, Douglas S., "Acoustical Properties of Drill Strings", *J. Acoust. Soc. Am.*, (Mar. 1989),85(3).

Young, Warren C., et al., "Roark's Formulas for Stress and Strain", *Case 1, 7th Edition, McGraw-Hill*, (Sep. 13, 2001),p. 592, Section 13.8 Tables, Table 13.1.

Lapeyrouse, Norton J., "Formulas and Calculations for Drilling, Production, and Workover", 2nd edition, 2002, *Gulf Professional Publishing*, an imprint of Elsevier Science, (2002), p. 6.

Grover, Wayne D., et al., "Development and Performance Assessment of a Distributed Asychoronous Protocol for Real-Time Network Restoration", *IEEE Journal on Selected Areas in Communications*, (Jan. 1991),9(1): 112-125.

Besaisow, A. A., et al., "Development of a Surface Drillstring Vibration Measurement System", *60th Annual Technical Conference and Exhibition of the Society of Petroleum Engineers*, Las Vegas, NV, (Sep. 22, 1985), pp. 1-14.

Besaisow, A. A., et al., "Application of ADAMS (Advanced Drillstring Analysis and Measurement System) and Improved Drilling Performance", *IADC/SPE Drilling COnference*, Houston, TX, (Feb. 27, 1990), pp. 717-722.

Barnes, et al., "Passband for Acoustic Transmisssion . . . Drill String", *Journal Acout. Soc.of Amer.*, vol. 51, #5, (1972),pp. 1606-1608.

Squire, et al., "A new Approach to Drill-String Acoustic Telemetry", *SPE of AIME, SPE 8340*, (Sep. 1979).

Drumheller, Douglas S., "Wave Impedances of Drill Strings and Other Periodic Media", *J. Acoustical Society of America*, vol. 112, issue 6, (2002),2527-2539.

* cited by examiner

*Typ. Uphole (+d)-Downhole(-d) Symmetrical Sinusoid Signal Path (Prior Art w/o Isolation)*

Split Downhole
Sinusoid Signal Path

Isolated-Reflected-Recombined
Sinusoid Signal Path

ACOUSTIC TELEMETRY STACKED-RING WAVE DELAY ISOLATOR SYSTEM AND METHOD

CROSS-REFERENCE TO RELATED APPLICATION

This application claims the benefit of U.S. Provisional Patent Application No. 61/152,337, entitled "Acoustic Telemetry Stacked-Ring Wave Delay Isolator System and Method," filed Feb. 13, 2009, which is incorporated herein by reference.

BACKGROUND OF THE INVENTION

1. Field of the Invention

The present invention relates generally to telemetry apparatus and methods, and more particularly to acoustic telemetry isolation apparatus and methods for the well drilling and production (e.g., oil and gas) industry.

2. Description of the Related Art

Acoustic telemetry is a method of communication used, for example, in the well drilling and production industries. In a typical drilling environment, acoustic extensional carrier waves from an acoustic telemetry device are modulated in order to carry information via the drillpipe as the transmission medium to the surface. Upon arrival at the surface, the waves are detected, decoded and displayed in order that drillers, geologists and others helping steer or control the well are provided with drilling and formation data. In production wells, downhole information can similarly be transmitted via the well casings.

The theory of acoustic telemetry as applied to communication along drillstrings has a long history, and a comprehensive theoretical understanding has generally been backed up by accurate measurements. It is now generally recognized that the nearly regular periodic structure of drillpipe imposes a passband/stopband structure on the frequency response, similar to that of a comb filter. Dispersion, phase non-linearity and frequency-dependent attenuation make drillpipe a challenging medium for telemetry, the situation being made even more challenging by the significant surface and downhole noise generally experienced.

The design of acoustic systems for static production wells has been reasonably successful, as each system can be modified within economic constraints to suit these relatively long-lived applications. The application of acoustic telemetry in the plethora of individually differing real-time drilling situations, however, presents other challenges. This is primarily due to the increased noise due to drilling, and the problem of unwanted acoustic wave reflections associated with downhole components, such as the bottom-hole assembly (or "BHA"), typically attached to the end of the drillstring, which reflections can interfere with the desired acoustic telemetry signal. The problem of communication through drillpipe is further complicated by the fact that drillpipe has heavier tool joints than production tubing, resulting in broader stopbands; this entails relatively less available acoustic passband spectrum, making the problems of noise and signal distortion more severe.

To make the situation even more challenging, BHA components are normally designed without any regard to acoustic telemetry applications, enhancing the risk of unwanted and possibly deleterious reflections caused primarily by the BHA components.

When exploring for oil or gas, in coal mine drilling and in other drilling applications, an acoustic transmitter is preferentially placed near the BHA, typically near the drill bit where the transmitter can gather certain drilling and geological formation data, process this data, and then convert the data into a signal to be transmitted up-hole to an appropriate receiving and decoding station. In some systems, the transmitter is designed to produce elastic extensional stress waves that propagate through the drillstring to the surface, where the waves are detected by sensors, such as accelerometers, attached to the drill string or associated drilling rig equipment. These waves carry information of value to the drillers and others who are responsible for steering the well. Examples of such systems and their components are shown in: Drumheller U.S. Pat. No. 5,128,901 for Acoustic Data Transmission through a Drillstring; Drumheller U.S. Pat. No. 6,791,474 for Reducing Injection Loss in Drill Strings; Camwell et al. U.S. Patent Publication No. 2007/0258326 for Telemetry Wave Detection Apparatus and Method; and Camwell et al. U.S. Patent Publication No. 2008/0253228 for Drill String Telemetry Methods and Apparatus. These patents and publications include common inventors with the present application and are incorporated herein by reference.

Exploration drilling in particular has become a highly evolved art, wherein the specification and placement of the BHA components is almost entirely dictated by the driller's need to drill as quickly and accurately as possible while gathering information local to the drill bit. A large variety of specialized BHA modules or tools are available to suit local conditions, and their inclusion in a BHA usually takes priority over the requirements of telemetry methods, acoustic or otherwise. The diversity of these BHA tools and the decision regarding whether or not to even include them in a drillstring, pose major issues for consideration; these issues have a significant impact when dealing with acoustic energy questions. Cyclic acoustic waves suffer multiple reflections and amplitude changes even in a very simple BHA, and the net effect of these changes may destructively interfere with the required acoustic telemetry broadcast signal. The reflections are caused by impedance mismatches which are the result of mechanical discontinuities present in all BHAs presently in use.

An initial response to this problem would be to place the acoustic telemetry device above the BHA and simply direct the acoustic energy up the drillstring, away from the BHA components. Unfortunately, this does not fully address the problem because typical acoustic transmitters emit waves of equal magnitude both up-hole and downhole, and the downward travelling waves in particular may be reflected resulting in destructive interference with the upward travelling waves. In the worst cases, this can cause virtually complete cancellation of the upward travelling communication signal.

It is known in other fields, for example in radio frequency (RF) transmitter design and electrical transmission lines, that wave reflections can be controlled by inserting simple specific impedance changes at certain distances from a transmitter, such that the combination of the original wave and the reflected wave combine constructively to produce a single wave travelling in one direction with increased amplitude. The standard approach is to insert a "quarter wave" ($\lambda/4$) impedance change (or odd multiples thereof) adjacent to the transmitter so that one wave (the "down" wave) is reflected in phase with the intended transmitted wave (the "up" wave) and constructively aids the intended transmitted wave by increasing its amplitude.

Downhole applications typically employ transmitters that emit stress waves of nearly equal, but not necessarily equal, magnitude in both directions. Moreover, each wave has the same sign in stress but opposite sign in material velocity. In such cases, the appropriate reflection device would be a λ/4 tuning bar (pipe section) placed below the transmitter. However, such a simple solution is often impractical because the equipment below the acoustic transmitter is designed to drill and steer the well rather than to aid telemetry. Equipment such as drill collars, crossover pipes, drilling motors and bits can easily nullify the benefit of simply introducing a λ/4 section of pipe below the acoustic transmitter because the equipment will generally be of differing lengths and impedances that can add to the λ/4 section and eliminate the intended benefit.

Other styles of transmitters which emit waves in both directions, but by design have different relationships between their stresses and material velocity, would require tuning bars of different lengths, not necessarily λ/4 sections, further complicating the problem.

As mentioned above, downhole noise is also of concern in acoustic telemetry. The problem of downhole noise is addressed to some extent in U.S. Pat. No. 6,535,458 to Meehan, wherein is taught a baffle filter comprising a periodic structure of typically 20 m length interposed above or below the acoustic source; this is intended to cause stopbands over a certain range of frequencies, the position of the baffle being to protect the acoustic transmitter from the sources of the noise. This teaching, however, does not address or anticipate the more serious problem of energy propagating in a "down" direction being reflected in a relatively unattenuated manner back to the transmitter where it may combine in a destructive manner with the energy propagating in an "up" direction, thereby causing possibly significant destruction of the signal intended to reach the surface.

As can be seen, then, the required upward travelling acoustic telemetry waves are often interfered with by unwanted reflections from impedance mismatches below the transmitter. The known art of inserting a tuning bar of appropriate length is usually ineffective because the local conditions often necessitate the addition of further BHA components that cause further reflections that can often destructively interfere with the upward travelling wave.

SUMMARY OF THE INVENTION

It is an object of the present invention to control wave reflections, in particular, in such a manner as to mitigate the otherwise potentially destructive reflections. Specifically, the present invention comprises an apparatus for placement adjacent to the transmitter, and a method for using same, that will beneficially reflect waves, such that:
A. the apparatus can be configured to be effective over a certain broadcast bandwidth, such that all the desired frequencies in a modulated telemetry signal are significantly and beneficially reflected at known places; and
B. the apparatus aids the transmitted wave by adding in phase, providing up to a 3 dB gain in the amplitude of the wave motion amplitude and a 6 dB gain in the wave energy.

An isolator according to the present invention seeks to effectively isolate essentially all down waves from the subsequent (i.e., downhole) BHA components, thus curtailing the possibility of waves that would have entered the BHA and returned with potentially destructive phases. Positioning an isolator according to the present invention below the transmitter can, in effect, make the lower BHA components essentially "acoustically invisible" over a bandwidth useful for acoustic telemetry.

The present invention is also intended to be applicable in situations other than real-time drilling with drillpipe or production wells with production tubing. For example, many relatively shallow wells are drilled with coiled tubing. Although coiled tubing drilling systems do not have the passband/stopband features of drillpipe sections connected by tool joints, they do have BHA components similar to those in jointed pipe applications. Thus, the isolator and the isolation method taught herein are intended to apply equally to the situation of coiled tubing.

It is intended that the present invention be applicable in still further applications. For example, an isolation/reflection means as described herein can also be beneficial in production wells where there may not be a BHA as such, but there may instead be production components such as valves, manifolds, screens, gas lift equipment, etc., below the acoustic source. Thus, the apparatus and method taught herein are intended to apply equally to this situation.

It is not intended that an exhaustive list of all such applications be provided herein for the present invention, as many further applications will be evident to those skilled in the art.

Thus it is to be understood that downward traveling acoustic energy is reflected upward, and upward traveling acoustic energy is reflected downward. Moreover, it is to be understood that acoustic energy could be arriving simultaneously from both directions and the acoustic isolator is simultaneously reflected back towards the drilling components that originally injected the energy.

A detailed description of an exemplary embodiment of the present invention is given in the following. It is to be understood, however, that the invention is not to be construed as limited to this embodiment.

It is an object of the present invention to provide a tubular member exhibiting low wave speed and constructed of a number of rings of differing materials arranged in a periodic pattern comprising:
identical first rings of a first material and first inner diameter, first outer diameter, and first length; identical second rings of a second material and second inner diameter, second outer diameter, and second length; two identical third rings of a third material and third inner diameter, third outer diameter, and third length; these rings being stacked as follows: a third ring, a first ring, a second ring, an arbitrary number, including zero, of repeating first-second ring patterns ending with a first ring, and a third ring; the properties and sizes of these rings selected to yield a period structure exhibiting stopband and passbands, such as the aforementioned drill string, containing frequencies with low wave speeds and high acoustic impedances.

The mandrel of the isolator is loaded by series of alternating low-high density rings, the lengths of which cause reflections in the acoustic wave such that the net wave velocity is significantly slowed by their action. This speed disparity sets up an efficient means of producing a phase shift across a useful band of frequencies. The phase shift provides a means of reflecting acoustic waves.

A detailed description of an exemplary embodiment of the present invention is given in the following. It is to be understood, however, that the invention is not to be construed as limited to this embodiment.

BRIEF DESCRIPTION OF THE DRAWINGS

In the accompanying drawings, which illustrate the principles of the present invention and an exemplary embodiment thereof.

DETAILED DESCRIPTION OF THE PREFERRED EMBODIMENTS

In the following description, reference is made to "up" and "down" waves, but this is merely for convenience and clarity. It is to be understood that the present invention is not to be limited in this manner to conceptually simple applications in acoustic communication from the downhole end of the drillstring to the surface. It will be readily apparent to one skilled in the art that the present invention applies equally, for example, to subsurface stations, such as would be found in telemetry repeaters.

Figure 1:
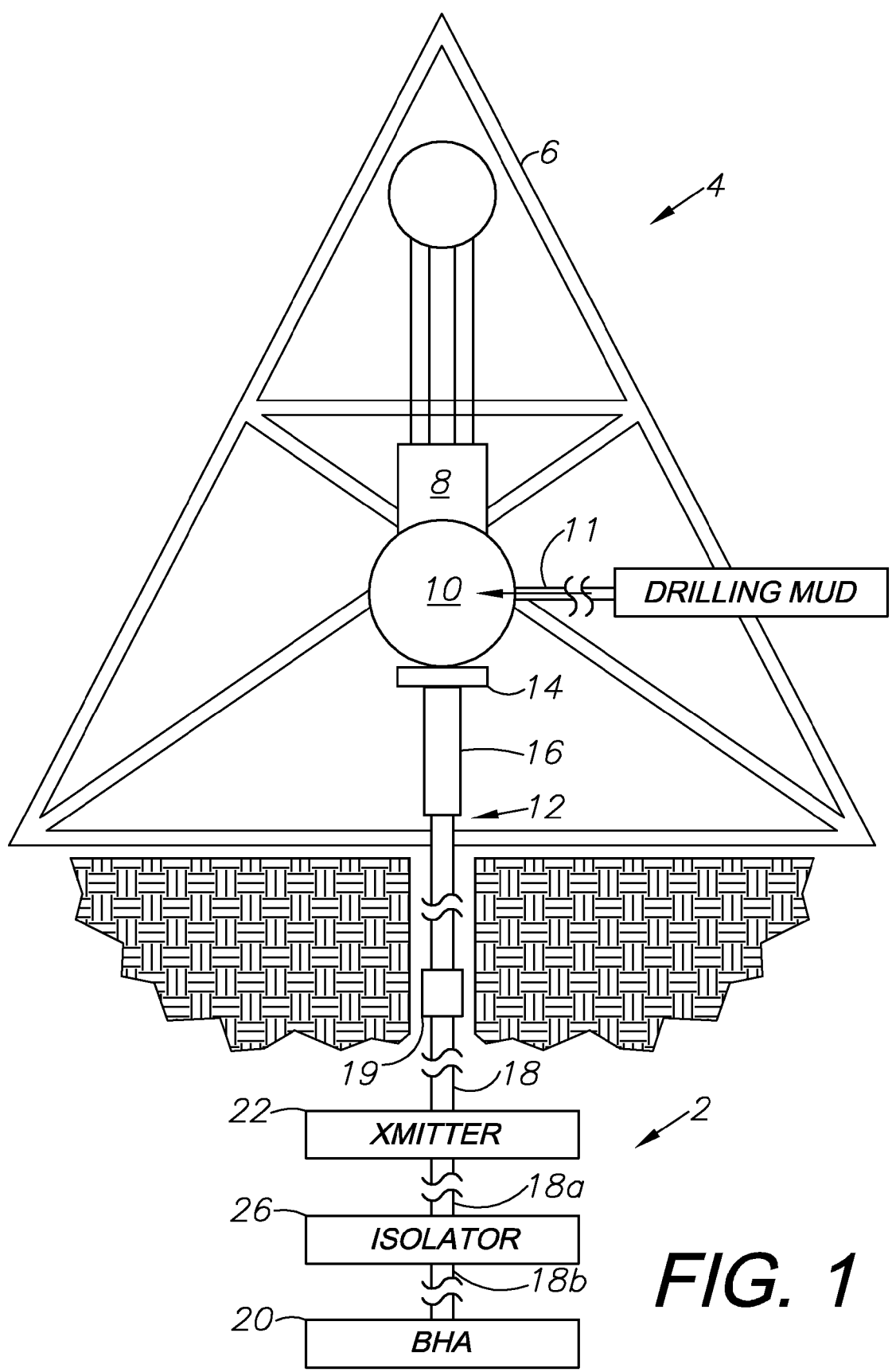
FIG. 1 is a diagram of a typical drilling rig, including an acoustic telemetry isolation system embodying an aspect of the present invention.

Referring to the drawings more detail, the reference numeral 2 generally designates a stacked-ring acoustic telemetry isolation system embodying an aspect of the present invention. Without limitation on the generality of useful applications of the system 2, an exemplary application is in a drilling rig 4 (FIG. 1). For example, the rig 4 can include a derrick 6 suspending a traveling block 8 mounting a kelly swivel 10, which receives drilling mud via a kelly hose 11 for pumping downhole into a drillstring 12. The drillstring 12 is rotated by a kelly spinner 14 connected to a kelly pipe 16, which in turn connects to multiple drill pipe sections 18, which are interconnected by tool joints 19, thus forming a drillstring of considerable length, e.g. several kilometers, which can be guided downwardly and/or laterally using well-known techniques. The drillstring 12 terminates at a bottom-hole apparatus (BHA) 20. Other rig configurations can likewise employ the acoustic isolation system of the present invention, including top-drive, coiled tubing, etc.

The acoustic isolation system 2 is incorporated along the drillstring 12, e.g., just above the BHA 20, or at other desired locations therealong. An upper, adjacent drillpipe section 18*a* is connected to a stacked-ring acoustic isolator 26 at an upper interface 28*a*. The isolator 26 is connected to a downhole adjacent drillpipe section 18*b* at a lower interface 28*b*. Without limitation, the isolator 26 can be located below a piezoelectric transducer (PZT) transmitter 22. Examples of such acoustic transducers and their construction are shown in Drumheller U.S. Pat. No. 5,703,836 for Acoustic Transducer and Drumheller U.S. Pat. No. 6,188,647 for Extension Method of Drillstring Component Assembly, which are incorporated herein by reference.

The focus of the present invention is to implement designs of isolators 26 comprising stacked rings such that judicious control of their impedances and transient times may result in a useful and necessary apparatus, i.e. the stacked-ring acoustic isolator 26 which can be incorporated in the acoustic isolation system 2.

The wave speed c and characteristic acoustic impedance z of a tubular pipe or ring of uniform material properties and wall area are $$c = \sqrt{E/\rho} \quad [1]$$

$$z = \sqrt{\rho E} A = \rho c A \quad [2]$$

where
ρ=material mass density and
E=material stiffness (Young's modulus)
A=wall area of the pipe Wave speeds and impedances of individual pipes or rings are limited by the selection of candidate materials for application to the drilling environment. Lead is perhaps the limiting example of a material with low wave speed of 1188 m/s and high impedance of 180 Mg/s for tubular sizes typical of the oilfield drilling environment. The object of this invention is to provide assemblies of rings or pipes that exhibit still lower values of wave speed and comparable values of impedance. This object can be achieved with a periodic structure of individual tubular elements. The analysis of this periodic structure begins with a well-known matrix relationship that expresses the forces and material velocities at the top end of an individual tubular element to those at the bottom end:

$$\begin{bmatrix} F_b \\ v_b \end{bmatrix} = [P] \begin{bmatrix} F_t \\ v_t \end{bmatrix} \quad [3]$$

where $$[P] = \begin{bmatrix} \cos\phi & -iz\sin\phi \\ -(i/z)\sin\phi & \cos\phi \end{bmatrix}$$

Figure 2:
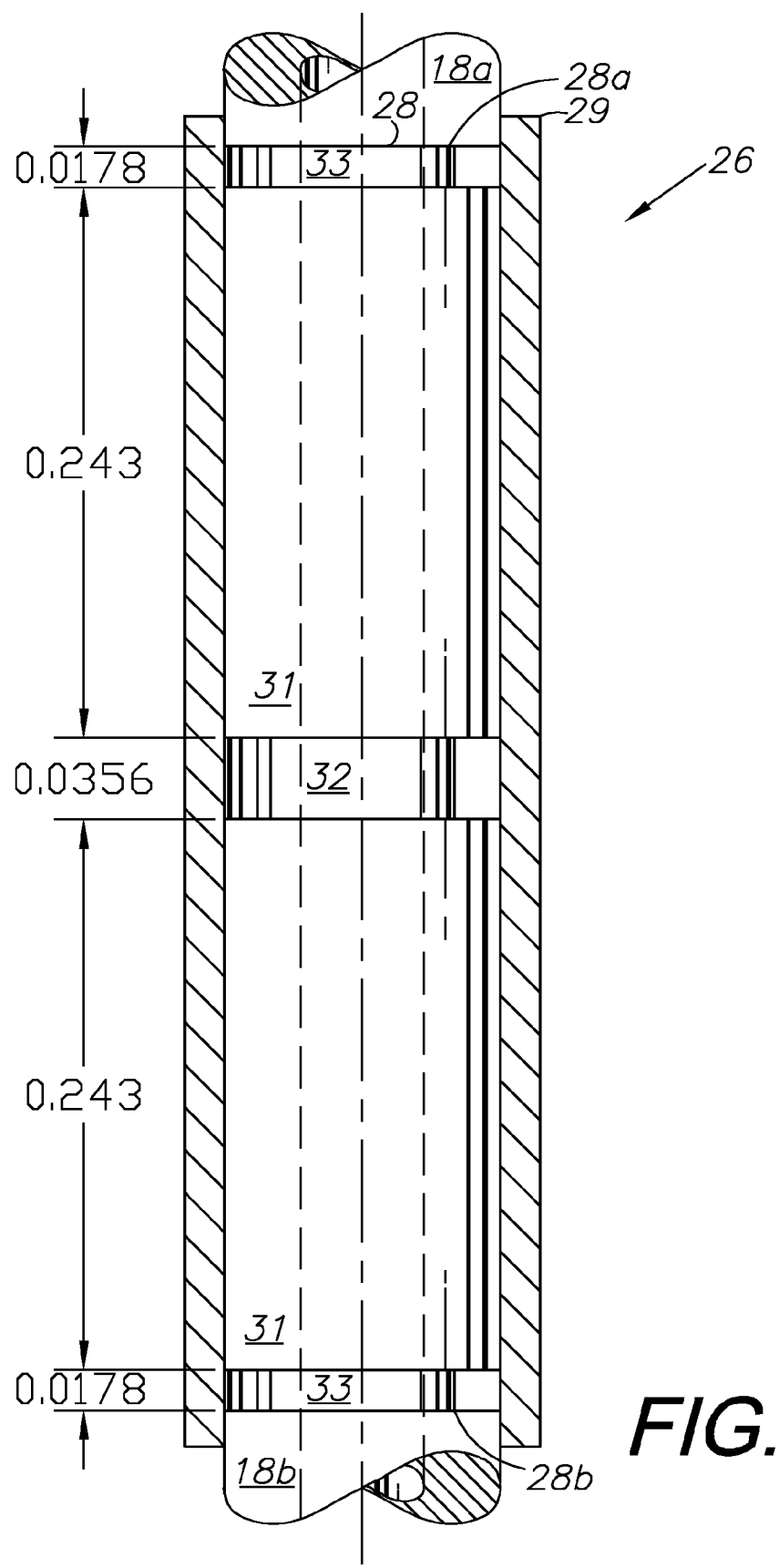
FIG. 2 is a fragmentary, side elevational view of the acoustic telemetry isolation system, particularly showing an isolator thereof.

$\phi = \omega l/c$ $F_t$=force at the top of the element
$v_t$=material velocity at the top of the element
$F_b$=force at bottom the element
$v_b$=material velocity at bottom the element
l=length of the element
ω=circular frequency in radians per second A stack of tubular or cylindrical elements or "rings" is constructed by placing the bottom end of one element on the top end of its neighbour. The corresponding matrix relationship between the forces and material velocities at the top and bottom of the assembled stack of elements is $$\begin{bmatrix} F_B \\ v_B \end{bmatrix} = [T] \begin{bmatrix} F_T \\ v_T \end{bmatrix} \quad [4]$$

where the matrix [T] is the ordered product of the individual matrices [P] for each of the individual elements forming the stack. As an example, a stack 28 illustrated in FIG. 2 has individual [P] matrices and the ordered product of these matrices yields the matrix [T]. Special solutions of equation [4] exist for which $$\begin{bmatrix} F_B \\ v_B \end{bmatrix} = \begin{bmatrix} F_T \\ v_T \end{bmatrix} \exp(i\omega L/c) \qquad [5]$$

where
c=wave speed of the stack
L=length of the stack
The combination of [4] and [5] yields a classical eigenvalue problem:

$$\{[T] - [1]\exp(i\omega L/c)\} \begin{bmatrix} F_T \\ v_T \end{bmatrix} = [0] \qquad [6]$$

where [0] and [1] are the null vector and the unit matrix, respectively. For a specified frequency the solution of [6] yields the eigenvalue c and the eigenvector $z=F_B/v_B=F_T/v_T$. It is known that these solutions yield small values of wave speed c in combination with large values of impedance z. These are the required parameters used in designing a parallel path isolator (see, U.S. Provisional Patent Application Ser. No. 61/148,995.

Example

TABLE 1

| Material | Nylon | WCuNi |
|---|---|---|
| ρ (kg/m³) | 2600 | 17000 |
| E (GPa) | 3.37 | 276 |
| A (m²) | 0.0021 | 0.008 |
| Cylinder length (m) | 0.0356 | 0.243 |

Figure 3:
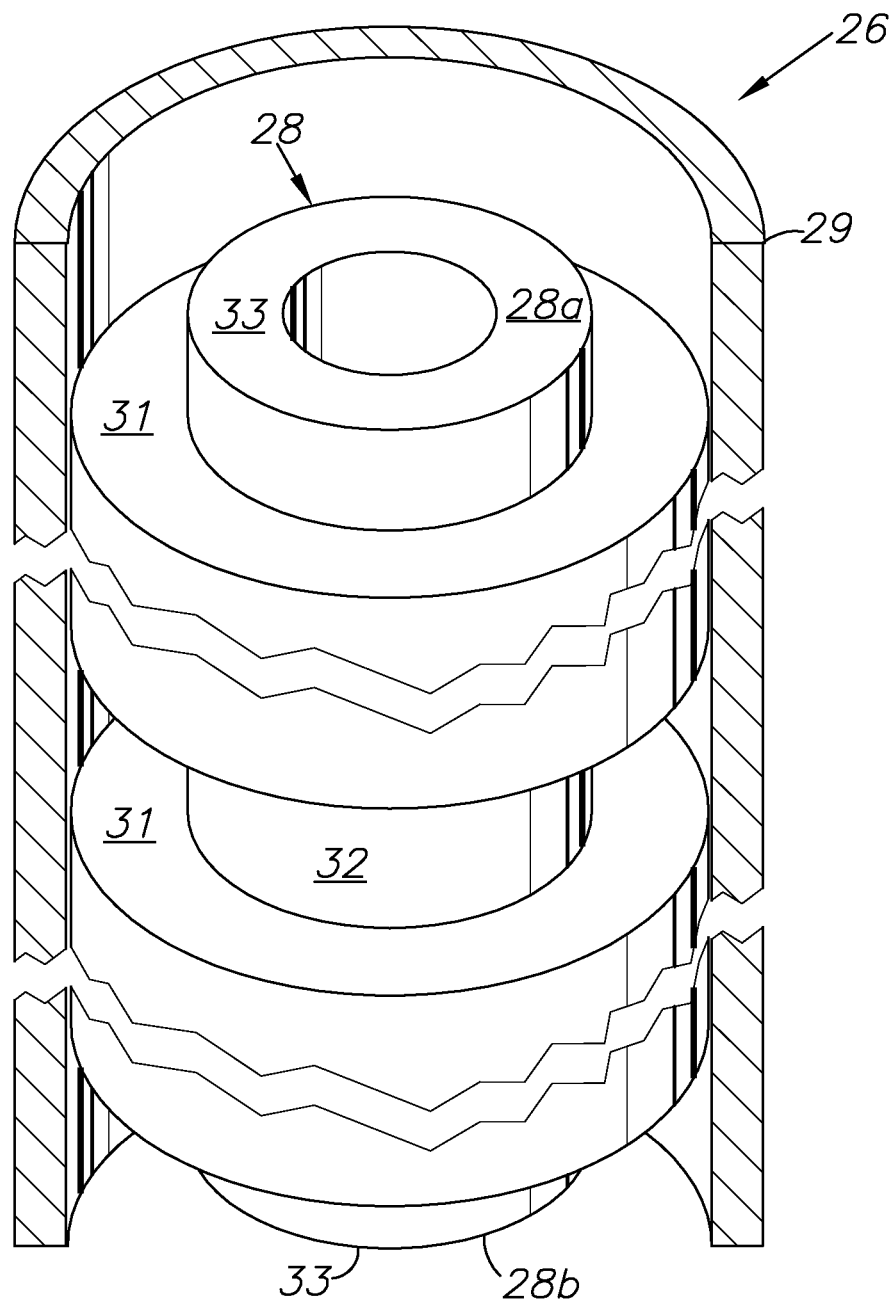
FIG. 3 is a perspective view of the isolator.

Consider exemplary tubular elements or rings made of Nylon and WCuNi (tungsten copper nickel) alloy with properties and sizes listed in Table 1. The first rings 31 of the invention have the WCuNi properties, the second ring(s) 32 of the invention have the Nylon properties, and the third rings 33 of the invention have the Nylon properties with the length divided in half. The stack of these rings contains two first rings 31, one second ring 32, and two third rings 33. (See FIGS. 2 and 3) Note that the total length of this stack is $L = 2(0.0356 + 0.243) = 0.557$ m, which is less than one-quarter that of previous best-practice isolator designs.

Figure 4:
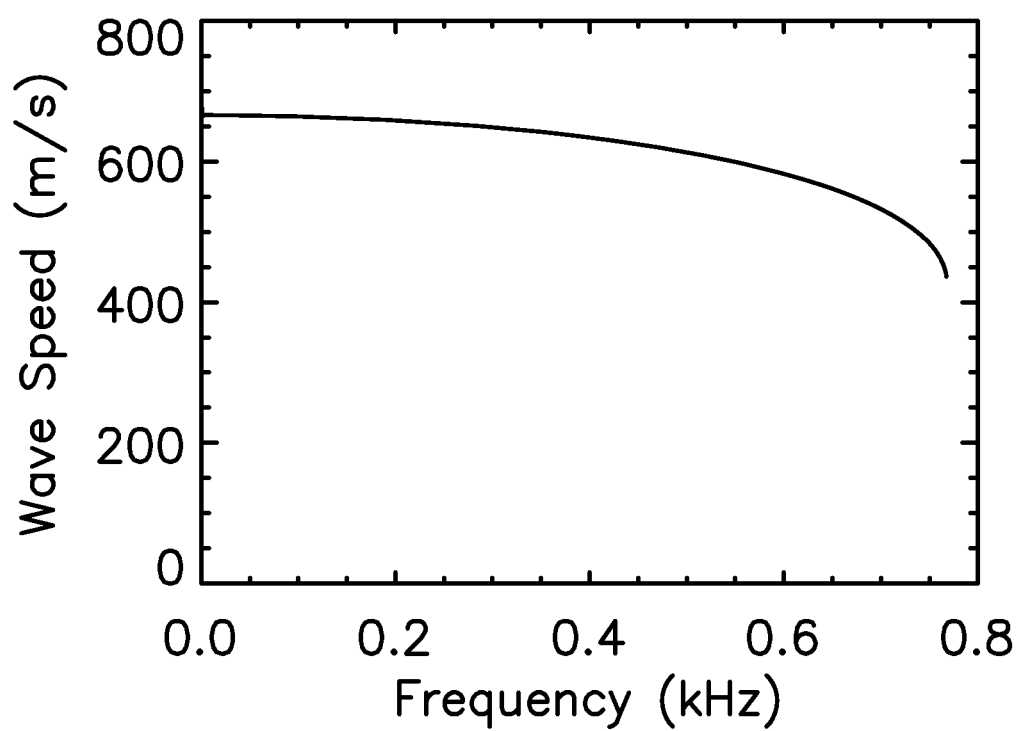
FIG. 4 is a plot of the wave speed through the isolator over a frequency range from 0 to 800 Hz.
Figure 5:
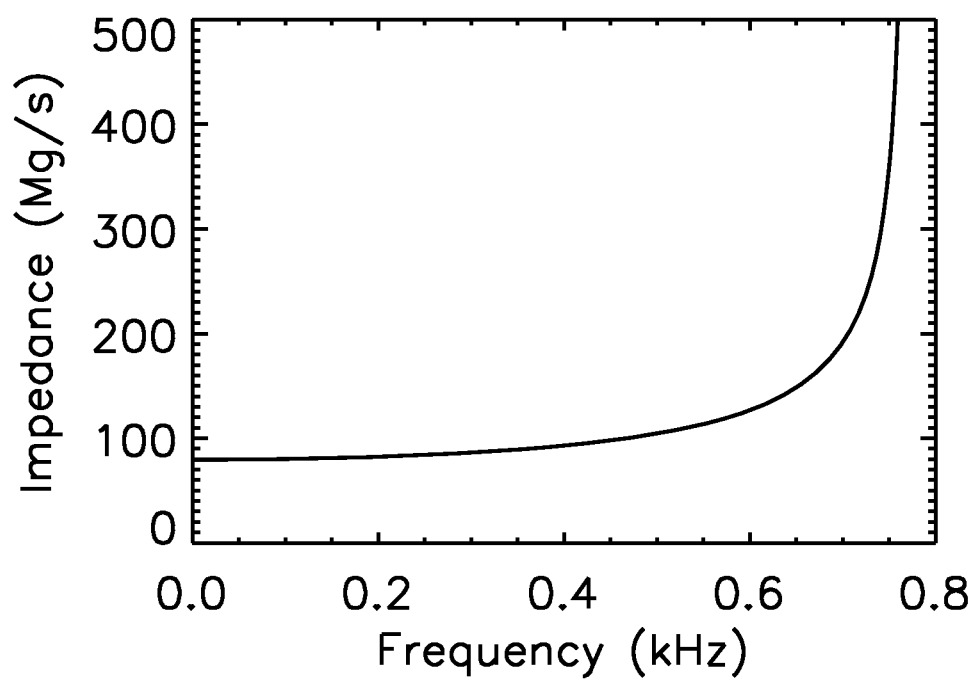
FIG. 5 is a plot of the impedance values for the isolator over a frequency range from 0 to 800 Hz.

The eigenvalue solution of [6] yields the wave speeds c shown in FIG. 4 and the impedances z shown in FIG. 5. Stack 28 will be used to isolate waves with frequencies in the neighbourhood of 660 Hz. Note that at this frequency the wave speed and impedance are:

$c = 556$ m/s $z = 155$ Mg/s.

Clearly these results can be changed by altering the material properties and dimensions as shown in Table 1. But these particular results are desired as this stack 28 is to be housed inside a tubular titanium housing 29 for which $c = 4860$ m/s $z = 88$ Mg/s.

Figure 6:
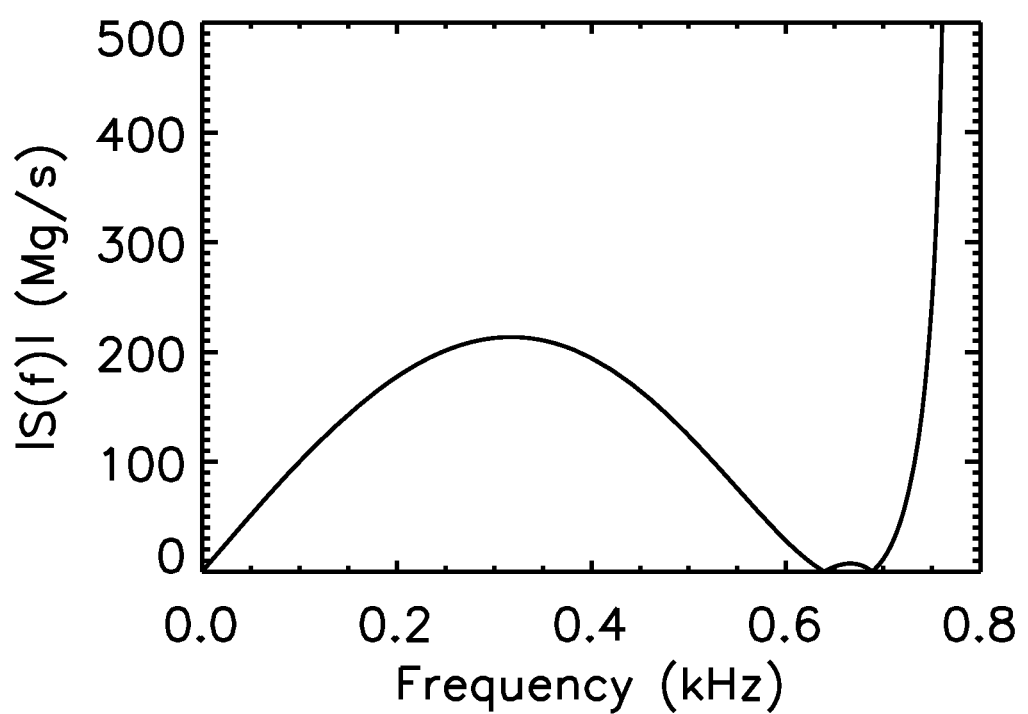
FIG. 6 is a plot of the pole equation for the isolator over a frequency range from 0 to 800 Hz.
Figure 7:
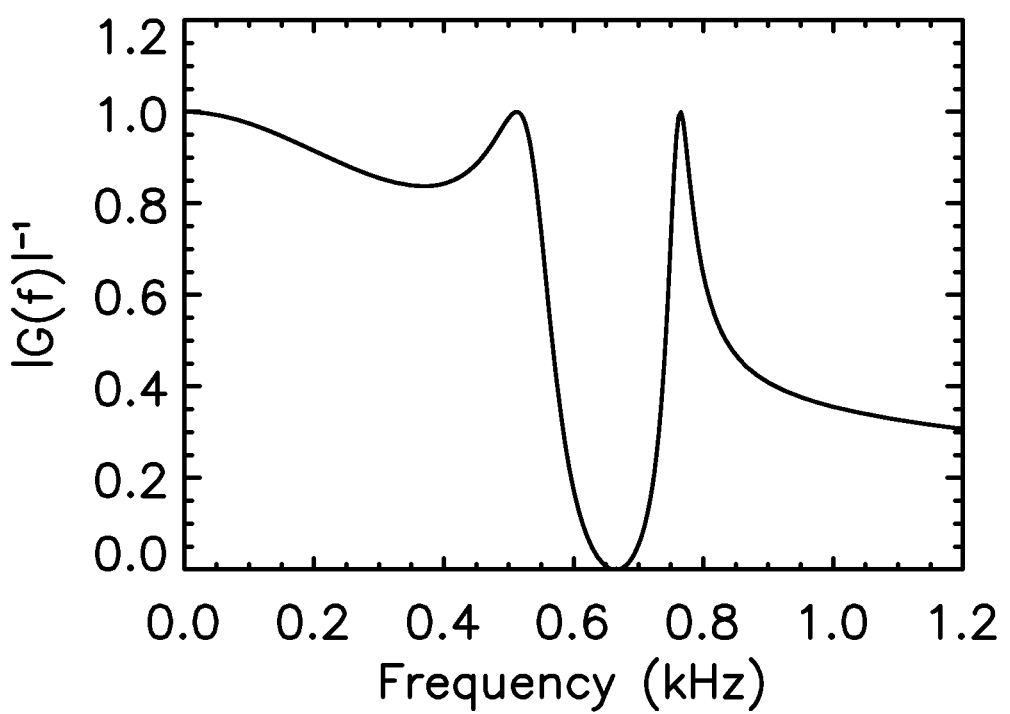
FIG. 7 is a plot of the transfer function for the isolator over a frequency range from 0 to 1200 Hz.

The stack 28 and the housing 29 form a parallel path isolator with the pole equation $S(f) = |z_2(1-P_1^2)P_2 + z_1(1-P_2^2)P_1|$ (See eq. 7 of U.S. Patent Application No. 61/148,995 for Parallel-Path Acoustic Telemetry Isolation System and Method, which is incorporated herein by reference) plotted in FIG. 6 and the transfer function $I = G(f)T$ (See eq. 7 of U.S. patent application Ser. No. 61/148,995) is plotted in FIG. 7. Note that 660-Hz waves are completely blocked by this isolator 26.

Divided, Split, Reflected and Recombined Acoustic Sinusoidal Signals

Figure 8A:
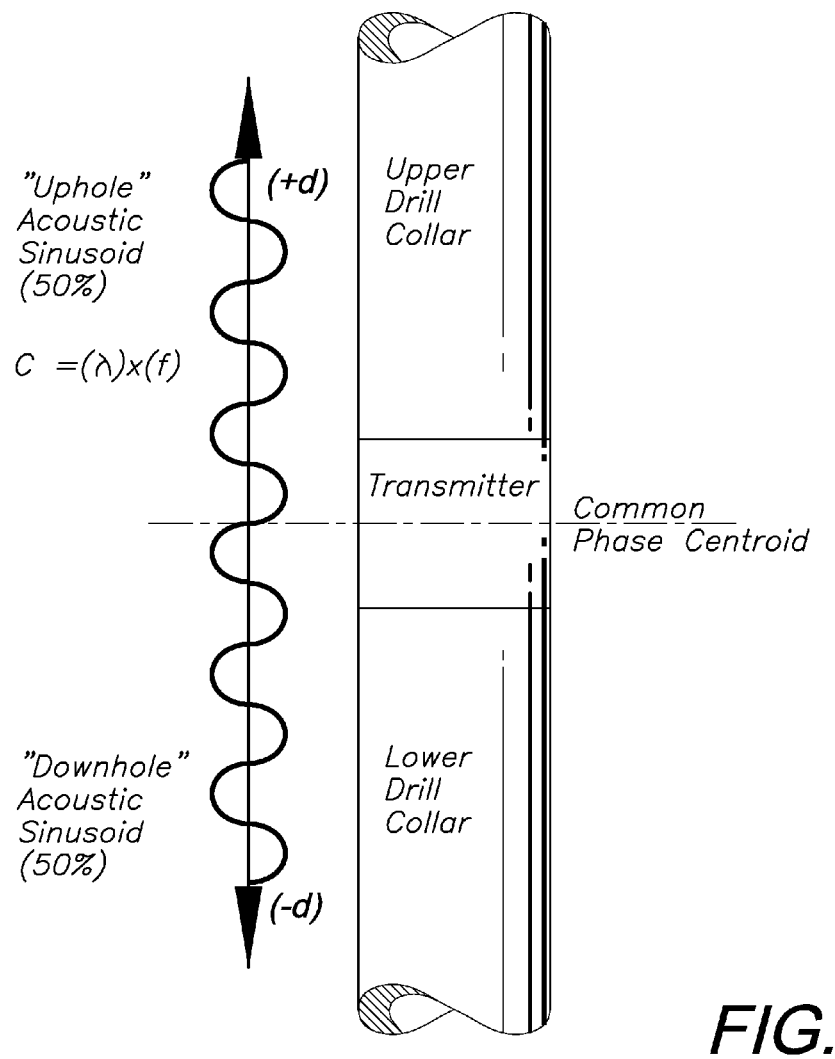
FIG. 8*a* is a diagram showing the equally-divided acoustic sinusoidal telemetry signal transmitted uphole (50%) and downhole (50%).
Figure 8B:
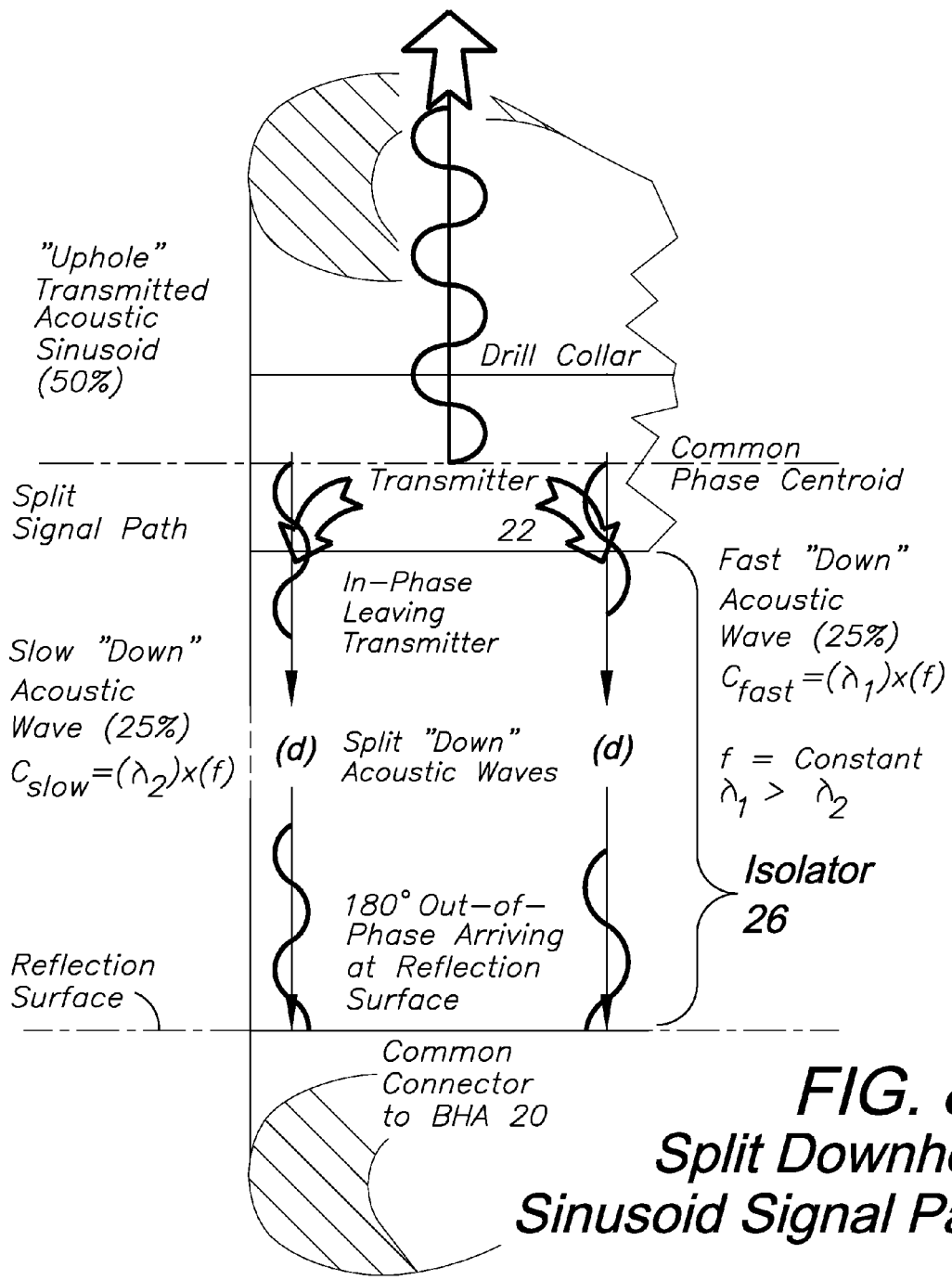
FIG. 8*b* is a diagram showing the downhole portion of the acoustic wave split into slow and fast (Cslow and Cfast) signal paths with corresponding short and long wavelengths (λ1 and λ2) at the same frequency (f).
Figure 8C:
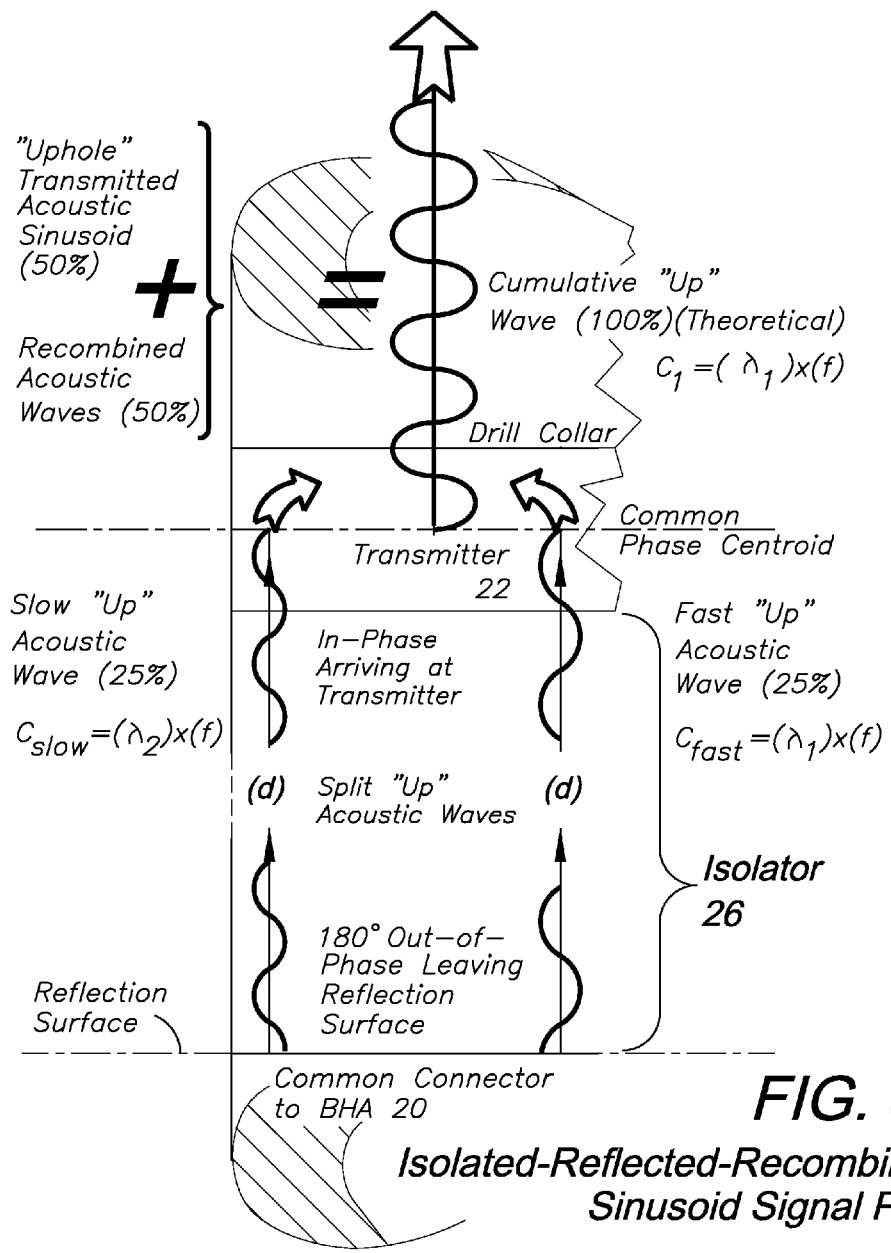
FIG. 8*c* is a diagram showing the slow and fast (Cslow and Cfast) downhole portions of the acoustic wave reflected, traveling upward and recombined in-phase in the transmitter, further combining with the uphole (50%) signal, resulting in a cumulative, maximum-amplitude (100%, theoretical) up-wave being transmitted to the surface for optimal reception with minimal interference.

FIGS. 8*a-c* show the paths of the signals through the isolator 26 of the present invention, and emitting therefrom for reception and analysis. The signal waves are shown in FIGS. 8*a-c* in More specifically, the reflection and redirection at the BHA 20, combined with the impedance-based slowing effect of the isolator 2, result in a recombined carrier telemetry signal emitting upwardly from the transmitter, which theoretically approaches 100% signal strength.

In order to further explain and clarify the principles upon which this invention depends in a non-mathematical and therefore non-rigorous manner, FIGS. 8*a-c* show how the 'up' and 'down' waves travel and interact with various sections of the isolator 26, the transmitter 22 and each other. For example, FIG. 8*a* shows a simple PZT stack (transmitter) generating symmetrical sinusoidal acoustic waves in a drill collar. Because the system is axially symmetric, the upward-travelling waves and the downward-travelling waves are of equal amplitude and have a common phase center at the centroid of the transmitter. Thus 50% of the signal goes up, and 50% goes down. It is the down signal that could be reflected by uncontrolled impedances comprising the BHA 20 between the transmitter 22 and the drill bit that may result in a reflection that travels up and deleteriously interferes with the up signal at the transmitter 22 (FIGS. 8*b-c*). The acoustic isolator 26 of the present invention avoids this problem by reflecting, redirecting and recombining the downhole signal with the uphole signal for a cumulative signal gain above the transmitter 22.

FIG. 8*b* shows the isolator 26 between the transmitter 22 and a collar section above the BHA 20, with the collar section joining the two main parts of the isolator 26. The isolator 26 is shown in FIGS. 8*a* and 8*b* with a split signal path comprising slow and fast acoustic wave pathways implemented in parallel. In an actual drillstring 12 these sections are tubular members disposed coaxially, one being an outer housing and the other being an inner mandrel. In one embodiment the slow wave structure is a modified outer housing internally supporting a series of rings of dissimilar material and geometry (see Table 1 and FIG. 3), with a coaxial but separate inner pipe (mandrel) having a simple tubular structure.

Because the transmitter is basically a dipole antenna faced by similar impedances, 50% of the signal goes up the drill collar and hence the drill pipe toward the surface. The 50% signal going down toward the BHA 20 is split into two equal amplitude signals, thus 25% travels down the mandrel at normal speed, and 25% travels down the slow wave structure. After the aforementioned distance (−d), the two down waves recombine at a common connector, e.g., to the BHA 20. The design is such that at the lower recombining surface the two down waves have a relative phase difference of approximately 180° (or a half wavelength=λ/2). The two paths suffer negligible loss as the invention does not depend on attenuating filters as typified by Arian et al. U.S. Pat. No. 7,997,380, Shah et al. U.S. Pat. No. 7,068,183 and Dubinsky et al. U.S. Pat. No. 6,915,875, and so have substantially equal amplitudes. The two-path geometry is such that the tubular pipes comprising the isolator present substantially equal impedances at the common connector interface, thereby being independently reflected upward. This reflection from the common connector due to the phase difference at the interface over the frequency band of interest is substantial (see FIGS. 6 and 7), approaching 100% reflectivity.

FIG. 8c shows that the upward waves return along the same paths, with the slow wave structure affecting the passage of its wave such that by the time it reaches the transmitter 22 it is again phase-shifted approximately 180° and slowed with respect to the 'normal' un-slowed reflected wave in the other path. Because the round-trip, phase-delay reflection phase shifts add, the net result is that the two waves are in phase at the transmitter, i.e. 360°, whereupon they recombine to constructively add, thus presenting a reflected returning signal that is substantially equivalent in amplitude to those that were originally transmitted downward, in effect returning 50% of the transmitter's launched signal.

Concurrently with the downward-traveling waves reflecting and returning via the isolator 26, the transmitter 22 continues to transmit sinusoidal acoustic waves. The design of the slow wave structure elements and the length of the coaxial outer housing and mandrel can be adjusted such that the returning downhole component and the as-yet unmodified up-hole component can have substantially zero relative phase. Thus the 50% reflected down waves and the 50% up waves can coherently, cumulatively combine within the transmitter to provide substantially 100% of its output in the upward direction over a given bandwidth. This bandwidth is indicated in FIG. 6, providing a useful telemetry channel consistent with the bandwidth afforded by industry-standard drill pipe. For example, such a cumulative, nearly-100% signal can be effectively used as a strong carrier wave for data-carrying telemetry signals from the BHA 20.

It is to be understood that the invention can be embodied in various forms, and is not to be limited to the examples discussed above. For example, as noted above, the repeating first-second rings 31-32 patterns can comprise an arbitrary number, including zero. Moreover, the materials comprising the rings can be chosen from a wide range of suitable materials for particular applications based on desired wave speed and phase change functions and characteristics of the isolator 26. Other components and configurations can be utilized in the practice of the present invention.

Having thus described the invention, what is claimed as new and desired to be secured by Letters Patent is:

1. A method of controlling wave reflections in a drilling apparatus including a series of tubular drillstring members located between an acoustic transmitter and a bottom hole assembly (BHA), the method comprising the steps:
    placing the acoustic transmitter in proximity to the drilling apparatus;
    extending a series of tubular drillstring members between said acoustic transmitter and the BHA;
    providing a stacked-ring parallel path acoustic isolator comprised of a housing, a stack of first, second and third cylindrical rings with first, second and third lengths, respectively, aligned along a common axis placed within said housing, and upper and lower interfaces for connecting said isolator to the tubular drillstring members;
    the first length approximately equaling the second length;
    the third length approximately equaling one-half of said first or second length;
    placing said acoustic isolator beneath said transmitter and above said BHA along the series of tubular drillstring members;
    configuring the acoustic transmitter to transmit a split modulated telemetry signal in generally symmetrical uphole and downhole signal paths through the drillstring;
    configuring the acoustic isolator with slowed and unslowed signal pathways;
    splitting the downhole telemetry signal into slowed and unslowed downhole signals in the respective slowed and unslowed signal pathways;
    providing a relative phase shift of approximately 180° in the slowed downhole telemetry signal by controlling the impedance in the slowed pathway;
    providing a reflection surface below the acoustic isolator and above the BHA;
    reflecting the slowed and unslowed signals at the reflection surface back upwardly into the acoustic isolator with the slowed and unslowed signals approximately 180° out-of-phase with each other;
    further slowing the upwardly-traveling, reflected, slowed signal in the acoustic isolator slowed pathway;
    combining the reflected slowed and unslowed signals in phase with each other below the transmitter; and
    combining the isolated, reflected, recombined downhole signal with the uphole signal in phase above the transmitter.

2. The stacked-ring acoustic isolator method of claim 1, which includes:
    said rings comprising a material with a relatively small wave speed and a relatively large impedance;
    a piezoelectric transducer located along the drillstring; and
    the acoustic isolator is located below said transducer.

3. The stacked-ring acoustic isolator method of claim 1, further comprising:
    the stack of cylindrical rings formed by stacking three separate rings of different length and different diameter, including a first ring of a first length and a first diameter, a second ring of a second length and a second diameter, and a third ring of a third length and a third diameter.

4. The stacked-ring acoustic isolator method of claim 3, further comprising:
    a stack of cylindrical rings including two of said first rings, one of said second rings, and two of said third rings;
    said second ring being placed between said two first rings; and
    said stack of first and second rings placed between said two third rings.

5. The stacked-ring acoustic isolator method of claim 4, wherein:
    the first ring comprised of a Tungsten-Copper-Nickel (WCuNi) alloy; and
    the second and third rings comprised of Nylon.

6. The stacked-ring acoustic isolator method of claim 4, wherein:
    the first length equals the second length; and
    the third length equals one-half of said first or second length.

7. The stacked-ring acoustic isolator method of claim 1 wherein the housing is of titanium.

8. A method of controlling wave reflections in a drilling apparatus including a series of tubular drillstring members located between an acoustic transmitter and a bottom hole assembly (BHA) with a drill including a drill bit, the method comprising the steps:

placing the acoustic transmitter in proximity to the outer housing surface of the drilling apparatus;

extending a series of tubular drillstring members between said transmitter and the BHA;

providing a stacked-ring parallel path acoustic isolator comprising an outer housing, an inner mandrel coaxially in parallel with said housing, a stack of first, second and third cylindrical rings with first, second and third lengths, respectively;

the first length approximately equaling the second length;

the third length approximately equaling one-half of said first or second length;

said rings being aligned along a common axis and placed in contact with either of said housing or said mandrel;

placing said acoustic isolator beneath said transmitter and above said BHA along and connected to the series of tubular drillstring members by respective upper and lower interfaces;

transmitting with said transmitter acoustic telemetry signals in said drillstring, said signals comprising up-hole and downhole components traveling upwardly and downwardly from said transmitter respectively;

said parallel path acoustic isolator formed by said housing and said mandrel having a pole equation represented by:

$$S(f) = Z_2(1-P_1^2)P_2 + Z_1(1-P_2^2)$$

configuring the acoustic isolator to respond to a specified broadcast bandwidth in said downhole signal component, such that all desired frequencies in a modulated telemetry signal are reflected at known locations within the isolator substantially without attenuation;

configuring the acoustic isolator with slowed and unslowed signal pathways;

splitting the downhole telemetry signal into slowed and unslowed downhole signals in the respective slowed and unslowed signal pathways;

at said lower interface providing a relative phase shift of approximately 180° in the respective slowed pathway by controlling an impedance in said acoustic isolator at a desired telemetry signal frequency;

at said lower interface substantially reflecting the slowed and unslowed signals upwardly;

at said upper interface combining the reflected slowed and unslowed signals; and at or above said acoustic transmitter coherently combining the combined, reflected signal with said up-hole component for a net amplitude gain, thereby substantially doubling the amplitude of the up-hole acoustic telemetry signal waves above said transmitter.

9. The stacked-ring acoustic isolator method of claim 8, wherein:

the first length equals the second length; and the third length equals one-half of said first or second length.

10. The method of controlling wave reflections in a drilling apparatus of claim 8, further comprising the step:

configuring the acoustic isolator to aid a wave transmitted down the drillstring by the transmitter by adding to the wave in phase;

providing up to 3 dB gain in the amplitude of the wave motion amplitude of the transmitted wave; and providing up to 6 dB gain in the wave energy of the transmitted wave.

11. The method of controlling wave reflections in a drilling apparatus according to claim 8, wherein the stacked-ring acoustic isolator further comprises:

a stack of cylindrical rings including two of said first rings, one of said second rings, and two of said third rings;

said second ring being placed between said two first rings; and said stack of first and second rings placed between said two third rings.

12. The method of controlling wave reflections in a drilling apparatus of claim 8, wherein the stacked-ring acoustic isolator further comprises:

forming the first ring from a Tungsten-Copper-Nickel (WCuNi) alloy; and forming the second and third rings comprised of Nylon.

13. The method of controlling wave reflections in a drilling apparatus of claim 8, wherein the stacked-ring acoustic isolator further comprises:

the first length equals the second length; and the third length equals one-half of said first or second length.

14. The method of controlling wave reflections in a drilling apparatus of claim 8, wherein the stacked-ring acoustic isolator further comprises:

forming the housing from titanium.

* * * * *